Patented Nov. 30, 1948

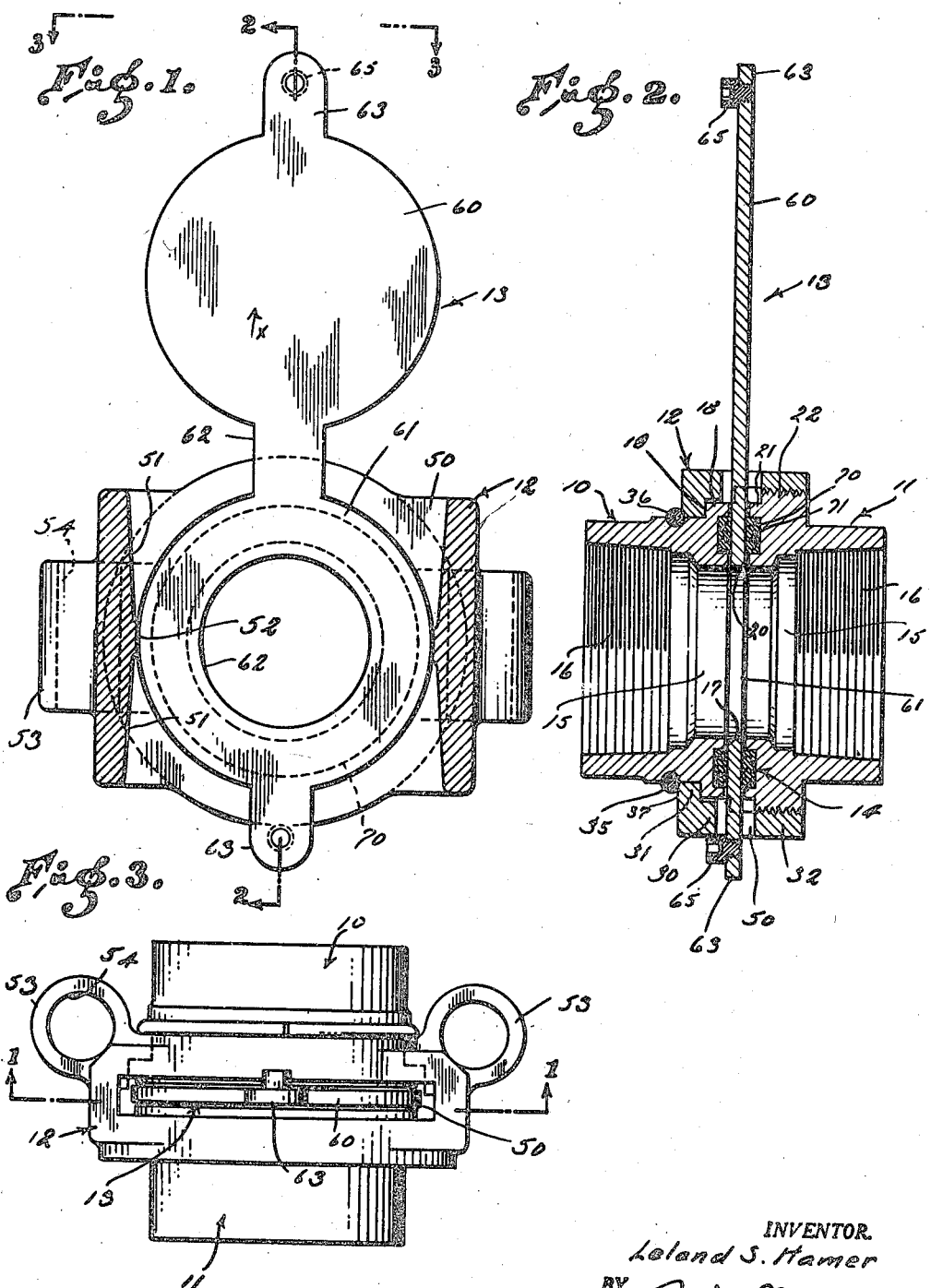

2,455,120

UNITED STATES PATENT OFFICE 2,455,120

PIPE-LINE FITTING

Leland S. Hamer, Long Beach, Calif., assignor of one-fourth to Paul A. Dewhirst, Los Angeles, Calif.

Application July 19, 1944, Serial No. 545,603

2 Claims. (Cl. 138—44)

This invention has to do with a pipe line fitting and it is a general object of the invention to provide a simple, improved pipe line fitting for connecting adjoining pipe sections and for handling a plate such as a blinding plate or an orifice plate, or both.

There are numerous situations where it is desirable to join sections of a pipe line by a releasable coupling such as is ordinarily known as a "union," and there are numerous situations where it is required to provide a pipe line with what is known as an orifice fitting or a line blind. As conditions change a line blind or orifice fitting may not be needed and yet the line may require a union.

With the equipment generally available it is necessary to equip a line with a union or with a line blind or an orifice fitting, and if a change is required from one to the other it is necessary to make a complete substitution, all of which involves considerable expense and consumes a great amount of time.

It is an object of my present invention to provide a structure which can be operated either as a simple union for joining two pipe line sections or which can be operated to handle a plate such as an orifice plate or a line blinding plate. The device of the present invention involves elements essential to a union and these elements instead of being confined to serve as a union are of such character as to accommodate a plate either an orifice plate or a line blinding plate, with the result that the device can be used either as a union or as a line blind or as an orifice fitting.

It is a general object of the present invention to provide a pipe line fitting involving a plate section with separate parts such as a blind plate and an orifice plate which section can be moved to bring either plate into operation by simple longitudinal shifting. The device of the present invention carries the plate section so that it is shiftable in one direction, that is longitudinally, to move either end or either plate portion into operative position. The structure of the present invention is a distinct improvement over the usual construction found in devices of this kind as the usual device requires that the plate section be turned end for end or be swung and also shifted, or otherwise moved in a compound or complicated manner.

The various objects and features of my invention will be fully understood from the following detailed description of a typical preferred form and application of the invention, throughout which description reference is made to the accompanying drawings, in which:

Fig. 1 is a transverse sectional view through a fitting embodying the present invention. Fig. 2 is a longitudinal sectional view of the fitting, being a view taken as indicated by line 2—2 on Fig. 1. Fig. 3 is a plan view of the fitting being a view taken as indicated by line 3—3 on Fig. 1, and indicating the line on which the section, Fig. 1, is taken.

The device of the present invention involves, generally, body sections 10 and 11 applicable to opposed pipes, or the like, a collar section 12 joining the body sections, a plate section 13 and a sealing means 14 for acting between the body sections and the plate.

The body sections are applicable to the ends of pipe parts, or the like, to form extensions or continuations thereof and have openings 15 for handling fluid. In the particular form of the invention illustrated in the drawings the body sections 10 and 11 are provided at their outer ends with internally threaded parts 16 for the reception of the pipe ends. It is to be understood that the body sections can be finished or formed for connection to the pipe parts in any suitable manner. The threaded means of connection is desirable where it may be required that the fitting be removed from the pipe line. However, where the installation is permanent, or relatively so, the body sections may be welded to the ends of the pipe parts.

The body section 10 has a flat finished inner end face 17 opposed to the body section 11 and is provided at its inner end portion with an outwardly projecting radial flange 18. The flange 18 presents an outwardly facing shoulder 19 that cooperates with the collar 12 as will be hereinafter described.

The body section 11 is similar, generally, to the body section 10, and has a flat finished inner end face 20 opposing the face 17 of section 10. The section 11 has a radially projecting flange part 21 corresponding to the flange 18 of section 10 and in addition has an enlargement or radially projecting flange portion 22, the exterior of which is provided with a screw thread.

The collar 12 which serves to join the end sections 10 and 11 has a central portion 30 surrounding the flanges 18 and 21 of the sections 10 and 11, respectively, has an inwardly projecting end portion 31 at one end of the central portion 30 projecting inward at the body section 10 to overlie the shoulder 19 of flange 18, and an internally threaded end portion 32 at its other end surrounding the flange 22 of section 11. The threads of the flange 22 and the end part 32 fit together or cooperate so that the collar is threaded to the body section 11.

The end flange portion 31 of the collar cooperates with the flange 18 on the body section 10 so that the body section 10 is coupled to the collar. A retaining ring 35, or the like, is applied to the exterior of the body section 10 to prevent displacement of the collar 12 from the section 10 in a direction away from the body section 11.

The ring 12 may be a split ring seated in a groove 36 provided at the exterior of the body section 10 to project from the body and overlie the end 37 of the flange part 31. The end flange part 31 of the collar is a continuous annular part, as is the threaded end part 32 of the collar.

In accordance with my invention the central portion 30 of the collar, which joins the parts 31 and 32, has a passage-way 50 formed through it transversely of the fitting or in a direction transverse of the longitudinal of the fitting to freely accommodate the thickness of the plate section 13 as shown in Fig. 2, and it is made wide enough transversely of the axis of the fitting to accommodate the width of the plate as shown in Fig. 1.

To strengthen the collar and lend rigidity to it I prefer to form it so that it is substantially rectangular in section, as viewed in Fig. 1. Further, I prefer to form the passage 50 in the collar so that its side walls 51 taper somewhat inward from the two ends of the passage to central guide parts 52 which serve to centralize the plate section.

In practice the fitting is operated by engaging the collar 12 and rotating it so that it is threaded in either direction relative to the section 11. Any suitable means may be provided on the collar for the reception of suitable operating tools. In the preferred arrangement I provide bosses 53 on the exterior of the collar at diametrically opposite sides and provide openings 54 through the bosses for the reception of operating bars, or the like. The bosses with the openings 54 are shown in Figs. 1 and 3 of the drawings.

The plate section 13 is an elongate element with a blind plate 60 at one end and an orifice plate 61 at the other end. The two plates are joined by a neck 62 and are generally round in plan, as shown in Fig. 1, being of the same size and adapted to fit between the guide parts 52 in the collar 12.

In the particular case illustrated the blind plate 60 is a complete uninterrupted plate which when in the fitting opposite the openings 15 serves to close off or blind the fitting. The orifice plate 61 shown in the drawings has an orifice or fluid passage 62 formed centrally in it to pass fluid when the orifice plate is in working position, as shown in Figs. 1 and 2. The orifice 62 shown in the drawings is of the same size as the openings 15 in the body sections, it being understood that in practice the orifice plate may have an opening of any desired size through it.

A tab or extension 63 is provided at each end of the plate section 13 or at what may be termed the outer end of each of the plates. The tabs are proportioned so that when either of the plate sections is in operating position in the collar the tab on that plate section projects beyond or outward of the collar, as shown in Figs. 1 and 2 of the drawings.

Stops 65 in the forms of lateral projections are provided on the extension 63 to engage or cooperate with the collar in stopping endwise movement of the plate section. For example when it is desired to move the plate section into position so that the orifice plate is in operation the plate section is moved upward or in the direction indicated by the arrow X until the stop 65 on the extension 63 of the plate section 61 engages the collar 12 stopping further upward movement, whereas when it is desired to move the blind plate 60 into position the plate section is moved in the opposite direction until the stops 65 on the extension 63 of the blind plate engages the collar and stops further movement. I prefer, in practice, to make the stops 65 detachable from the extensions 63 so that either one or both of them can be removed allowing the plate section to be completely detached from the other parts of the fitting. In the drawings I have shown the stops screw threaded to the extensions 63 so that they can be readily removed when desired.

The sealing means 14 included in the construction is provided to seal between the body sections and the plate section. Sealing means is only necessary to seal between the plate and the body section at the pressure side of the fitting. However, I have shown sealing means to engage both sides of the plate section. In the plate form illustrated each sealing means involves an annular ring 70 of packing seated in a groove 71 provided in the face of the body section to surround the opening through the body section and to seal with the face of the plate.

In using the structure of the present invention the collar 12 is assembled on the body section 10 by applying the retaining ring 35, as above described. The body sections 10 and 11 are secured to the pipe parts so that they are in opposed relation and suitably spaced apart. The collar 12 is then operated to thread onto the flange part 22 of the body section 11, the collar being operated by engaging the lugs 53 projecting therefrom. If it is desired to employ either a blinding plate or an orifice plate the plate section 13 is arranged through the collar and between the opposing ends of the body sections and the stops 65 are applied so that the plate section will not become detached from the other parts of the fitting. The plate section is moved lengthwise to bring whichever portion is desired into operating position. Rotation of the collar while the plate section is held in the desired position will cause the body sections 10 and 11 to be moved toward each other into clamping engagement with the plate section, with the result that the sealing means 14 makes a tight seal between the body sections and the plate.

Whenever it is desired to change from one plate section to the other it is merely necessary to loosen the collar by suitable rotation and then move the plate lengthwise in one simple operation until the desired plate part is in operating position. When it is desired to use the device merely as a union one of the stops 65 is removed from the plate section and the plate section is completely detached or withdrawn from the other parts. The device may then be operated as a union by simply rotating the collar until the opposing ends of the body sections 10 and 11 are brought together. It will be obvious that the sealing means 14 carried by the ends of the body sections will engage and cooperate to effect a seal when the device is thus used as a union.

Having described only a typical preferred form and application of my invention I do not wish to be limited or restricted to the specific details herein set forth, but wish to reserve to myself any variations or modifications that may appear to those skilled in the art and fall within the scope of the following claims.

Having described my invention, I claim:

1. In a fitting of the character described, two body sections arranged with their inner ends in opposed relation, a collar coupling the sections and having a transverse passage open at opposite sides of the fitting, tool receiving bosses on the outer sides of the collar walls which form the end walls of the passage a plate carried in the passage in the collar with its end portions accessible at the exterior of the collar and projecting beyond each end of the passage, the plate being shiftable in the passage to bring different portions of the plate into register with the inner ends of the sections, and stop means limiting movement of the plate relative to the coupling including stops on the accessible portions of the plate projecting beyond the passage, one of the stops being detachable from the plate.

2. In a fitting of the character described, two body sections one with an external flange and the other with an external threaded part, a collar surrounding the sections and having a flange engaging the first mentioned flange and having a threaded part cooperatively engaging said threaded part of the other section, the collar having an opening located between its flange and its threaded part and extending transversely through it from one side of the fitting to the other, packing carried by the inner end of one section, a plate carried in the collar opening with end portions projecting from the ends of the opening and accessible at the exterior of the collar, the plate being shiftable in the collar opening to bring different portions into register with the ends of the sections to be engaged by the packing, and stops on the said projecting accessible end portions of the plate to limit movement of the plate relative to the collar and preventing its separation from the collar.

LELAND S. HAMER.

REFERENCES CITED

The following references are of record in the file of this patent:

UNITED STATES PATENTS

| Number | Name | Date |
| --- | --- | --- |
| 476,188 | Conner | May 31, 1892 |
| 1,112,066 | Hollis | Sept. 29, 1914 |
| 1,575,259 | Fisher | Mar. 2, 1926 |
| 1,921,298 | Lewis | Aug. 8, 1933 |
| 2,278,849 | Hamer | Apr. 7, 1942 |
| 2,344,747 | Sperry et al. | Mar. 21, 1944 |